US007003367B2

(12) United States Patent
Cheng et al.

(10) Patent No.: US 7,003,367 B2
(45) Date of Patent: Feb. 21, 2006

(54) EQUIPMENT MANAGEMENT METHOD

(75) Inventors: Fan-Tien Cheng, Tainan (TW); Chun-Yen Teng, Miaoli (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 10/254,139

(22) Filed: Sep. 24, 2002

(65) Prior Publication Data

US 2003/0208294 A1 Nov. 6, 2003

(30) Foreign Application Priority Data

Dec. 26, 2001 (TW) .............................. 90132396 A

(51) Int. Cl.
*G06F 19/00* (2006.01)
*G06F 3/00* (2006.01)

(52) U.S. Cl. ........................... 700/121; 700/96; 710/11

(58) Field of Classification Search ................ 700/121, 700/96; 710/11, 315
See application file for complete search history.

(56) References Cited

U.S. PATENT DOCUMENTS 5,657,252 A * 8/1997 George ......................... 702/83
5,809,234 A * 9/1998 Le Van Suu ................ 709/230
6,032,203 A * 2/2000 Heidhues ...................... 710/11
6,208,904 B1 * 3/2001 Mullen, Jr. ..................... 700/9
6,470,227 B1 * 10/2002 Rangachari et al. .......... 700/95
6,671,570 B1 * 12/2003 Schulze ....................... 700/121
6,708,074 B1 * 3/2004 Chi et al. .................... 700/121
6,842,660 B1 * 1/2005 Tripathi et al. ............. 700/121
2003/0083754 A1 * 5/2003 Tripathi et al. ................ 700/2

OTHER PUBLICATIONS

60/336,129.*

* cited by examiner

*Primary Examiner*—Paul Rodriguez
(74) *Attorney, Agent, or Firm*—MacPherson Kwok Chen & Heid LLP; David S. Park

(57) ABSTRACT

An equipment management method for managing semiconductor equipment via an equipment manager. In the equipment management method, production scenario rules and equipment behavior rules are first defined respectively in a production scenario database of a configuration controller and an equipment behavior database of an equipment driver. Them, a command is received from a manufacturing execution system (MES), and is converted into a production process scenario by looking up the corresponding production scenario rule in the production scenario database. Thereafter, the production process scenario is converted into a GEI (generic equipment interface) message with a GEI message specification, and the GEI message is transmitted to the equipment driver. Then, the GEI message is converted into equipment communication messages regulated by an equipment communication protocol by looking up the corresponding equipment behavior rule in the equipment behavior database. Then, the equipment communication messages are transmitted to equipment.

10 Claims, 12 Drawing Sheets

| | Item | Format | Value |
|---|---|---|---|
| Header | Transaction | integer | <Confirmation no> |
| | ScenarioID | integer | <Scenario ID> |
| | Command | string | <Command name> |
| | MachineID | integer | <Machine ID> |
| Content | <Content> | <Format> | <Parameter content> |
| | : | : | : |

Fig. 1 (PRIOR ART)

EQUIPMENT MANAGEMENT METHOD

FIELD OF THE INVENTION

The present invention relates to a managing method, and more particularly to a control method or scheme of a Generic Equipment Manager for the semiconductor industry.

BACKGROUND OF THE INVENTION

The manufacturing process of semiconductor is very complicated and delicate so that the requirements of equipment automation are rather high. Although most of equipment is itself automatic, it may not be connected with a manufacturing execution system (MES) to form an integrated system, wherein the MES generally determines production scenarios for controlling the production factors adopted in the equipment (tools). Therefore, some equipment may become an isolation island in the automatic manufacturing system, which means that the equipment receives no instruction from the MES. To solve the aforementioned problem of "isolation island" and to increase the equipment utilization, an Equipment Manager is introduced. Generally, the Equipment Manager first receives a command from the MES, and then converts the command into production scenarios, and then generates equipment rules from the production scenarios for operating at least one piece of equipment connected thereto, wherein the equipment rules are used in the Equipment Manager to control the operation parameters and conditions of the equipment. Nevertheless, the Equipment Managers existing in the market usually need to conduct respective modifications and adjustments with respect to various types of equipment so as to manage those various types of equipment properly, thus generating various versions of Equipment Managers (in accordance with various types of equipment). However, the difficulty level of maintaining those various versions of Equipment Managers is quite high, thus causing a lot of inconvenience and cost.

For solving aforementioned problems, the present invention provides a methodology that can easily change the production scenarios and equipment rules by merely editing the contents of associated databases without changing the structure of the main program for the Equipment Manager. Accordingly, the present invention can make the Equipment Manager generic so that it can handle various production scenarios and control different types of equipment.

SUMMARY OF THE INVENTION

It is therefore an objective of the present invention to provide a methodology that can easily change the production scenarios and equipment rules by editing the contents of associated databases without modifying the structure of the main program for the Equipment Manager. The Equipment Manager includes a configuration controller (CC) and an equipment driver (ED). For communication between the configuration controller and the equipment driver, the present invention also defines a specification of communication protocol called the generic equipment interface (GEI) message as the communication standard between the configuration controller and the equipment driver.

It is therefore another objective of the present invention to provide an equipment management method for managing an equipment through an equipment manager that includes a configuration controller, an equipment driver and a generic equipment interface for communicating between the configuration controller and the equipment driver through generic equipment interface messages. The method includes steps of providing a production scenario to be written into a controller database of the configuration controller, transmitting the production scenario into a equipment behavior database of the equipment driver via the generic equipment interface messages, transforming the production scenario into at least one equipment rule, receiving a communication protocol message from the equipment, transforming the at least one equipment rule into the generic equipment interface messages, and transmitting the generic equipment interface messages to the configuration controller and storing the generic equipment interface messages into the controller database of the configuration controller so as to monitor and control the equipment.

Preferably, the controller database of the configuration controller is a production scenario database.

Preferably, the configuration controller is used to read the production scenario database and transmits the production scenario to the equipment driver via the generic equipment interface messages.

Preferably, the configuration controller receives an event datum from the equipment driver via the generic equipment interface messages and edits the event datum into the production scenario database.

Preferably, the driver database is an equipment behavior database.

Preferably, the equipment driver receives a controlling datum from the configuration controller via the generic equipment interface messages to be saved into a specific space of the equipment behavior database, and to be transformed into a controlling message complying with the equipment communication protocol to be transmitted to the equipment.

Preferably, the equipment driver receives an equipment message complying with the equipment communication protocol and transforms the equipment message into the generic equipment interface message, and then transmits the generic equipment interface message to the configuration controller.

Preferably, the equipment rule complies with the at least one equipment communication message standard.

Preferably, the driver database defines therein a first set of transformation rules by which the production scenario is transformed into the equipment rule, and vice versa.

Preferably, the driver database defines therein a second set of transformation rules by which the equipment communication messages are transformed into the generic equipment interface messages, and vice versa.

Preferably, the equipment communication message standard includes at least one semiconductor industry's SECS II message standard.

Preferably, the at least one production scenario and the at least one equipment rule of the equipment manager are deployed or modified by simply editing the contents of the production scenario database and the driver database without modifying one of a program structure and codes of the equipment manager.

Preferably, the generic equipment interface message is the communication protocol message between the configuration controller and the equipment driver.

Preferably, by editing the production scenario database and the driver database, the equipment manager copes with all kinds of the normal production scenarios and the equipment rules.

Preferably, the equipment manager is generic so that it handles various production scenarios and control/monitor different kinds of equipment.

Preferably, when the exceptional production scenario and/or the equipment rule are encountered, they are handled by establishing at least one user defined function.

Preferably, the method of the present invention further comprises a step of: transforming the production scenario into a specific equipment communication message so as to send the specific equipment communication message to the equipment for a management purpose.

Preferably, the method of the present invention further comprises a step that transforming the specific equipment communication message into the at least one equipment rule, storing the equipment rule into the driver database of the equipment driver, and sending the equipment rule to the configuration controller for the management purpose.

Preferably, the method of the present invention further comprises a step that transforming the at least one equipment rule into a communication protocol message.

Preferably, the method of the present invention further comprises a step that transmitting said communication protocol message to the equipment.

Now the foregoing and other features and advantages of the present invention will be more clearly understood through the following descriptions with reference to the drawings, wherein:

BRIEF DESCRIPTION OF THE DRAWINGS

FIG. 1 s a diagram showing the architecture of GEI message of the prior art;

DETAILED DESCRIPTIONS OF THE PREFERRED EMBODIMENTS

Figure 3:
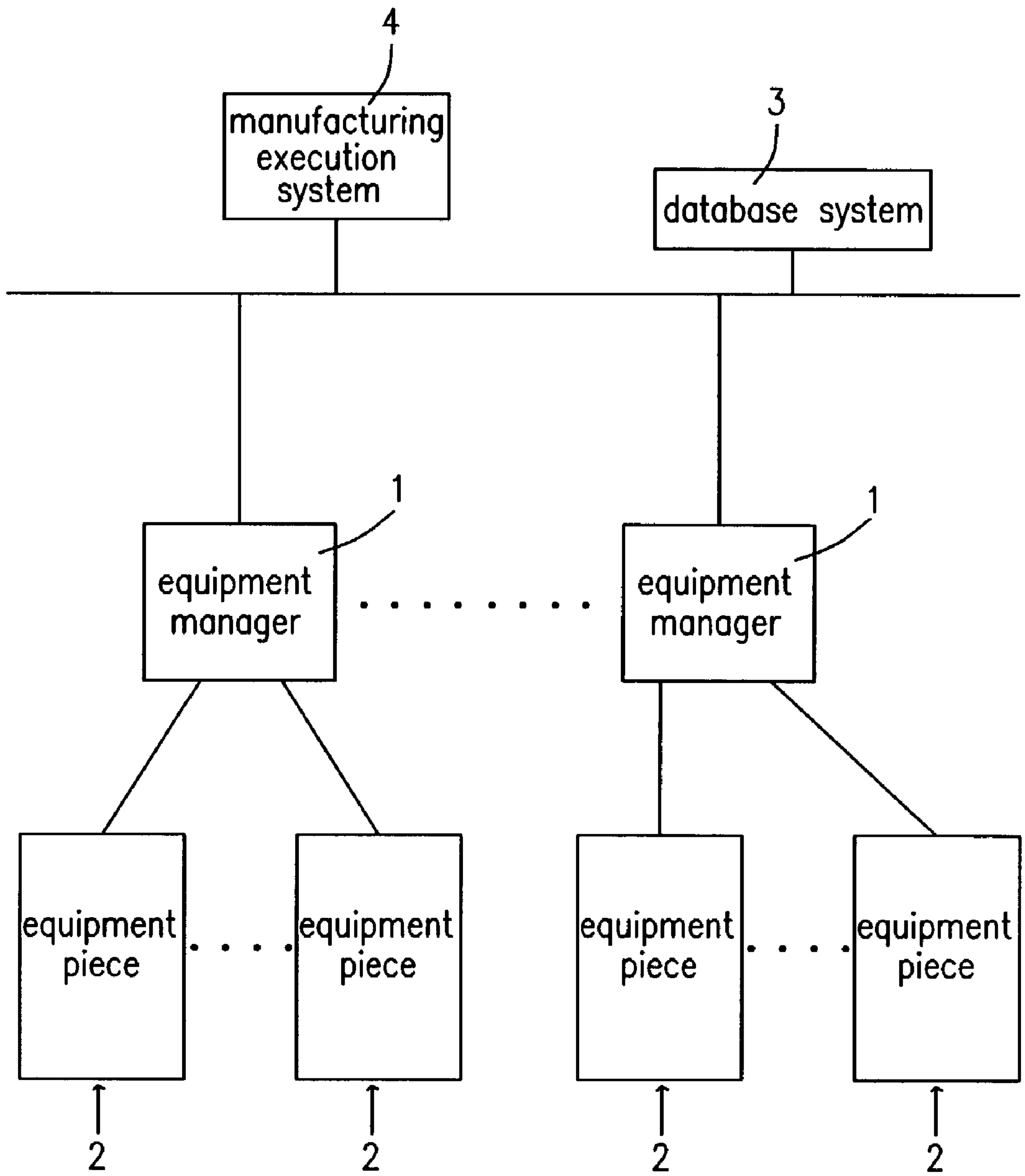
FIG. 3 is a deployment diagram of Generic Equipment Managers according to a preferred embodiment of the present invention.

The present invention provides a controlling or managing method or scheme for a Generic Equipment Manager for gathering information and supervising semiconductor equipment. As shown in FIG. 3, it is the schematic diagram showing the deployment of Generic Equipment Managers according to a preferred embodiment of the present invention. The dotted line A (FIG. 4) shows the application area of the present invention. In the present invention, the equipment managers 1 can be separately connected to several pieces of equipment 2, a database system 3, and a manufacturing execution system 4 so as to achieve generality and reusability.

Figure 4:
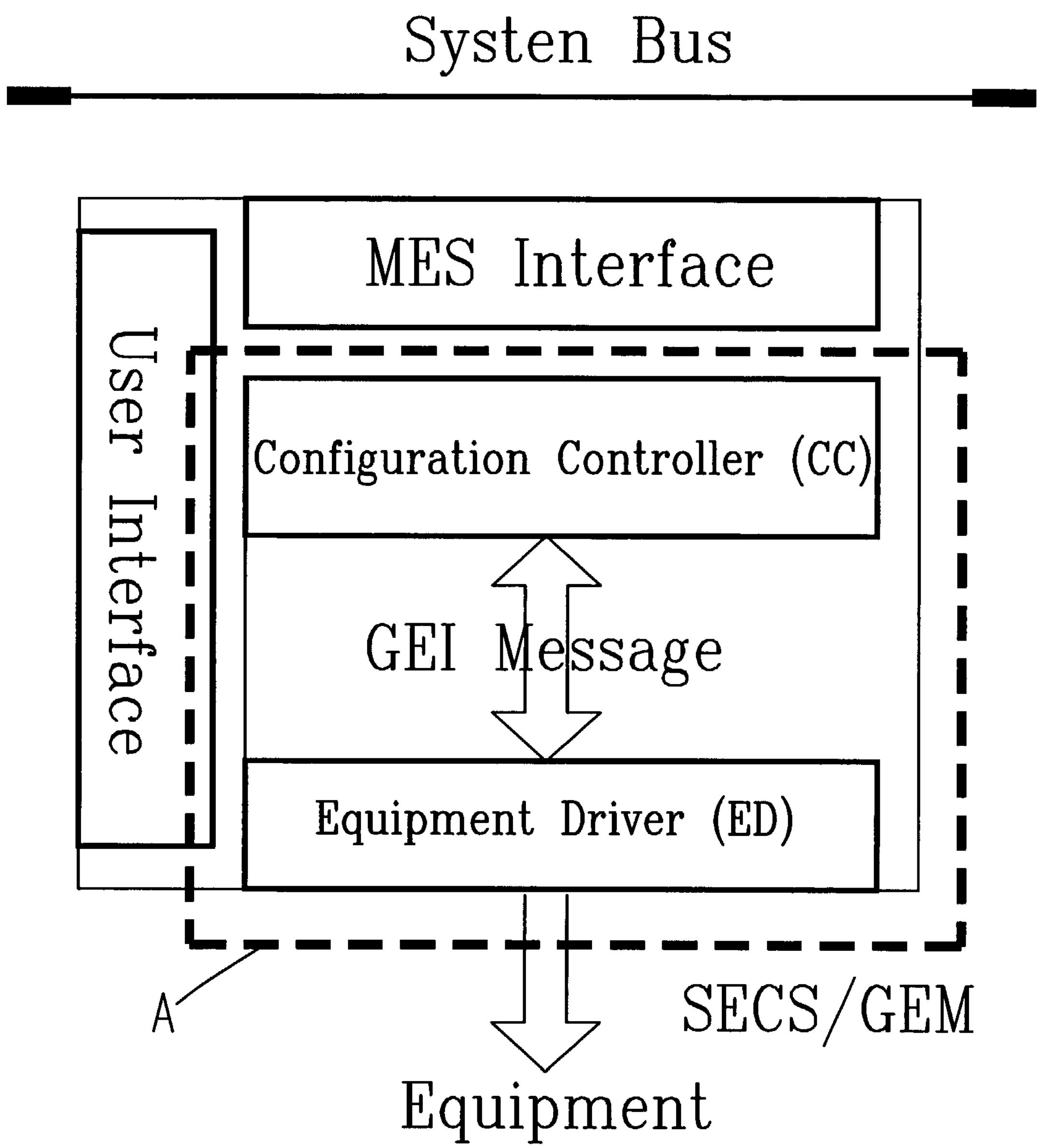
FIG. 4 is a systematic architecture of the Generic Equipment Manager according to a preferred embodiment of the present invention.

Please refer to FIG. 4, which is the systematic architecture of the Generic Equipment Manager of the present invention. Such as shown in FIG. 4, an equipment manager includes a configuration controller (CC), an equipment driver (ED), and a generic equipment interface (GEI) message specification as a communication standard between the configuration controller and the equipment driver. The present invention provides the following improvements according to the aforementioned architecture.

1. Redefine the specification of the generic equipment interface massage (GEI_message).

2. Redefine and re-plan the local database of the configuration controller, and additionally provide the availability of user-defined functions.

3. Redefine and re-plan the local database of the equipment driver, and additionally provide the availability of user-defined functions.

4. Renew and stipulate the communication process between the configuration controller and the equipment driver.

The detailed descriptions about the differences between the prior art and the present invention in respect of GEI message, production scenario database, equipment behavior database, and the communication processes between the configuration controller and the equipment driver are as follows.

1. Specification of the GEI Message

The present invention individually includes the configuration controller and the equipment driver by separating the production scenarios from the equipment rules. Also, the GEI message takes the charge of the communication between the configuration controller and the equipment driver.

Although the prior art also uses the concept of the GEI message, and provides a specification for the GEI message, the definition of the specification is unclear and impractical. The present invention redesigns a new architecture for the GEI message to maintain the reasonability and feasibility of the architecture. Relevant descriptions are as follows:

(1) Prior Art

Figure 2:
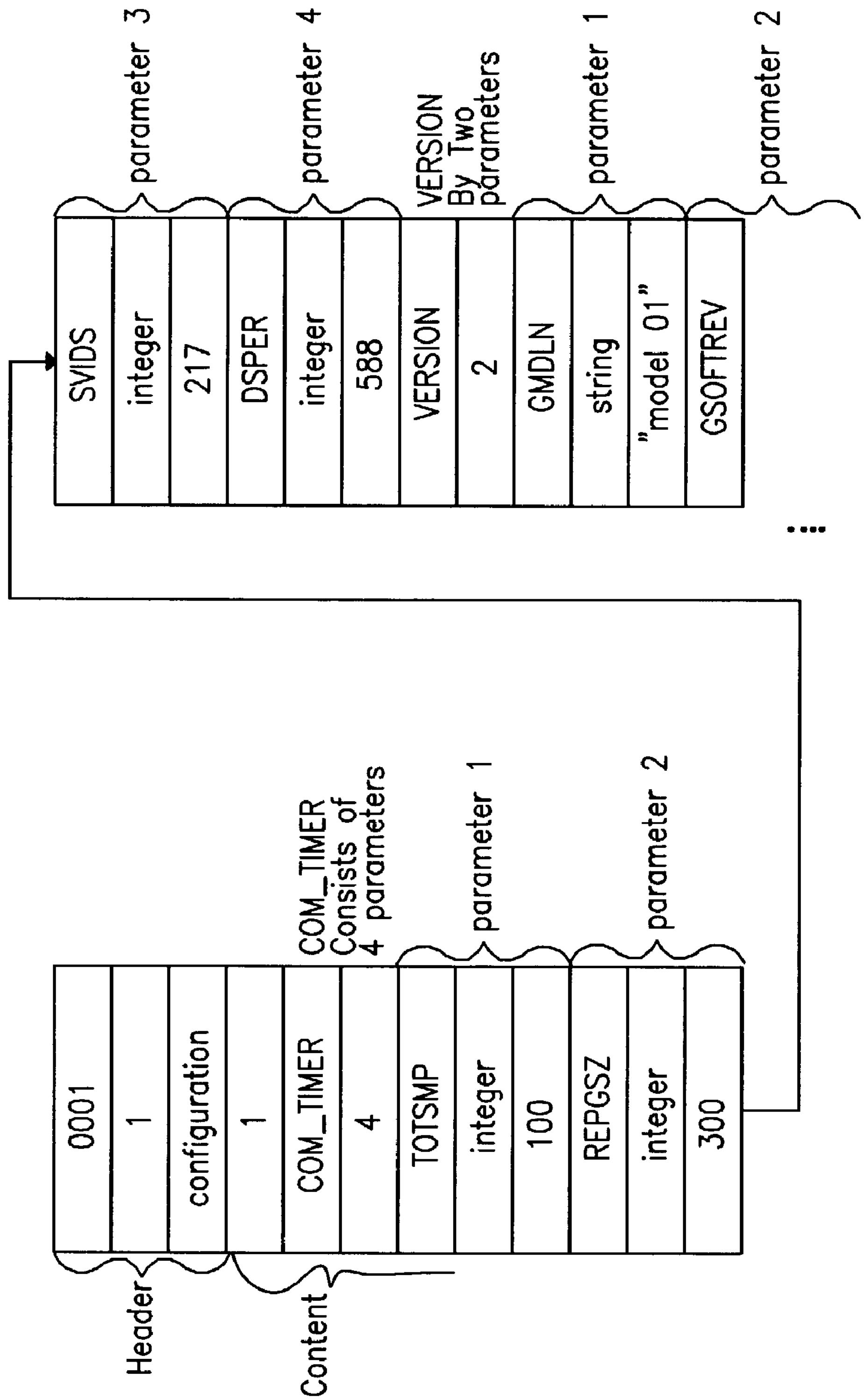
FIG. 2 is another diagram showing the architecture of GEI message of the prior art.

Please refer to FIGS. 1 and 2, which show the architecture for the GEI message in the prior art.

(2) The Present Invention

The GEI message is defined as the communication protocol between the configuration controller and the equipment driver. The header and contents of the message have the format as shown in the following.

Format Table of the GEI Message

Figure 5:
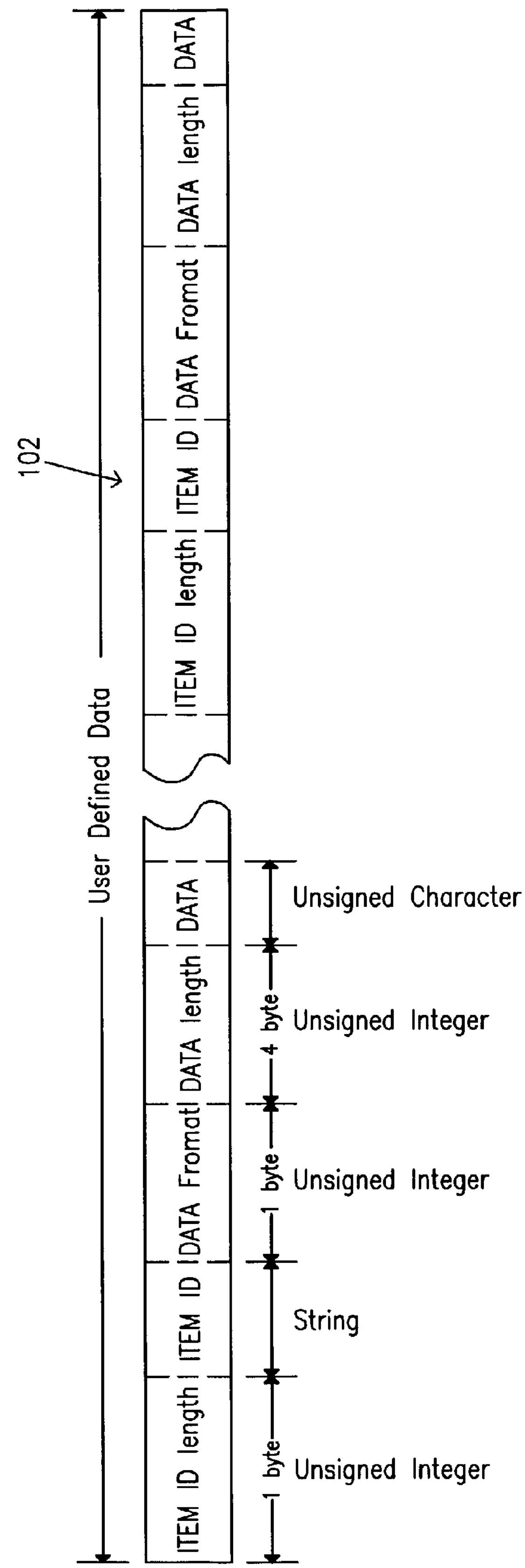
FIG. 5 is a schematic diagram showing the user-defined data format according to a preferred embodiment of the present invention.

| Item | Type | Description |
|---|---|---|
| GEI_MSGID | A | GEI_Mssage ID |
| GEI_MSGTYPE | I1 | GEI_Mssage type |
| TID | U4 | Transaction ID |
| EQID | A | Equipment ID |
| ItemNumber | U2 | Number of user defined data |
| ErrorCode | I2 | Error code |
| <User Defined Data> | V | User defined data |

Wherein the format of the user-defined data is defined in FIG. 5.

specification of the prior art defines the name of contents and the number, name, format, and contents of parameters without a strict stipulation in respect of their accessions. Hence it's difficult to be put into practice. On the contrary, the present invention has strict stipulations about those respects, and simplifies the accessing rules of the parameters in order to make sure that the specification of the GEI message is practical.

2. Production Scenario Database

The database used in the configuration controller is called the production scenario database.

(1) Prior Art

The table of the production scenario database defined by the prior art includes scenario table and GEI parameter tables (I), (II), (III) as shown in the following.

Scenario Table of the Prior Art

| SID | Step | 1 | 2 | 3 | 4 | 5 | 6 | 7 | 8 | 9 | 10 | 11 | 12 |
|---|---|---|---|---|---|---|---|---|---|---|---|---|---|
| 1 | 0 | FR-dispatch list | GS-configuration | GR-commack | GS-upload recipe | GR-recipe | FS-old recipe | FR-new recipe | GS-download recipe | GR-commack | GS-terminal display | GR-commack | EOS |
| 2 | 0 | FR-data id | GS-event setup | GR-commack | GS-trace setup | GR-commack | GS-alarm setup | GR-commack | EOS | | | | |
| 3 | 0 | GS-start lot | GR-commack | EOS | | | | | | | | | |
| 4 | 0 | GR-start lot | GR-commack | EOS | | | | | | | | | |
| 5 | 0 | GR-Trace report | GR-commack | EOS | | | | | | | | | |
| 6 | 0 | GR-Event report | GR-commack | EOS | | | | | | | | | |
| 7 | 0 | GS-pause | GR-commack | EOS | | | | | | | | | |
| 8 | 0 | GS-resume | GR-commack | EOS | | | | | | | | | |
| 9 | 0 | GS-ststus query | GR-status list | EOS | | | | | | | | | |
| 10 | 0 | GR-cancel lot | GR-commack | EOS | | | | | | | | | |
| 11 | 0 | GR-alarm report | GS-error handing process | EOS | | | | | | | | | |
| 12 | 0 | GR-end lot | GR-commack | FS-engineering data | EOS | | | | | | | | |
| 13 | 0 | GS-upload recipe | GR-recipe | FS-save old recipe | GS-resources removal | GR-commack | EOS | | | | | | |
| . | . | . | . | . | . | . | . | . | . | . | . | . | . |
| . | . | . | . | . | . | . | . | . | . | . | . | . | . |
| . | . | . | . | . | . | . | . | . | . | . | . | . | . |

(FS: Send FM; FR: Receive FM; GS: Send GEI; GR: Receive GEI; EOS: End of Scenario)

(3) Comparisons Between the Prior Art and the Present Invention

Comparing the specifications of the GEI message in the prior art and the present invention, it can be found that the most significant difference between them is the definitions of specifications of transmission contents. The GEI message GEI Parameter Table (I)

| Command | Content |
| --- | --- |
| Configuration | COM TIMER, VERSION, EVENT ID |
| Download Recipe | RECIPE |
| Recipe | LOCATION, RECIPE |
| Terminal Display | TEXT |
| Upload Receive | DIR UPLOAD |

GEI Parameter Table (II)

| Content | No. of Parameters | Parameter | Description |
| --- | --- | --- | --- |
| ALARM ID | 3 | ALARM1, ALARM2, ALARM3 | alarm to be enabled |
| COM TIMER | 4 | TOTSMP, REPGSZ, SVIDS, DSPER | GEM communication setting |
| DIR UPLOAD | 1 | "c:\recipe\" | Location to store uploading recipe |
| PP CHANGEN | 1 | PPNAME | Process program name |
| VERSION | 2 | GMDLN, GSOFTREV | Version number |
| RECIPE | 1 | PPNAME | Process program |
| . | . | . | . |
| . | . | . | . |
| . | . | . | . |

GEI Parameter Table (III)

| Parameter | Format | Value |
| --- | --- | --- |
| ALARM1 | Integer | 30000–30030 |
| ALARM2 | Integer | 40026–40028 |
| ALARM3 | Integer | 50000–50025 |
| TOTSMP | Integer | Total time for samping |
| REPGSZ | Integer | GSZ report |
| SVIDS | Integer | Status variable id |
| DSPER | Integer | Sampling delay time |
| PPNAME | String | TEXT |
| GMDLN | String | TEXT |
| RECIPE | Binary | . |
| . | . | . |
| . | . | . |
| . | . | |

(2) The Present Invention

The production scenario database of the present invention totally uses three tables, i.e. a process table, a GEI_sequence table and a GEI_Item table. Their formats are as follows:

(i) Process Table

| Item | Format | Description |
| --- | --- | --- |
| EQID | A | Primary Key, MAX = 20, NOT NULL |
| PROCESS_ID | A | Primary Key, MAX = 50, NOT NULL |
| GEI_MSGIDs | A | MAX = 255, NOT NULL |

EQID represents the reference number of the corresponding equipment. The PROCESS_ID is the identification code of the specific process. The GEI_MSGIDs represent the sequence for sending messages in the specific process.

The format of the GEI_MSGIDs is:

<GEI_MSGID 1><GEI_MSGID 2><GEI_MSGID 3> . . . <GEI_M (ii) GEI_Sequence Table

| Item | Format | Description |
| --- | --- | --- |
| EQID | A | Primary Key, MAX = 20, NOT NULL |
| GEI_MSGID | A | Primary Key, MAX = 50, NOT NULL |
| GEI_MSGTYPE | I1 | |
| GEI_DS | A | MAX = 255 |
| UDF_Replace | Boolean | |
| UDF_Enable | Boolean | |
| UDF_DLLID | A | MAX = 50 |
| UDF_PID | A | MAX = 50 |

The main purpose of this table is to help the configuration controller get the data sequence for transmitting message correctly through looking up this table. EQID represents the reference number of the corresponding equipment. The GEI_MSGID is the identification code of the GEI message. GEI_MSGTYPE represents the type of the GEI message. GEI_DS is the data sequence for transmitting the GEI message. The UDF_Replace represents a scheme as to whether the user-defined function (UDF) should be called to replace the transmitted/received GEI message. The UDF_Enable represents whether to execute the UDF or not. The UDF_DLLID represents the name of the dynamic linkage library including the UDF. The UDF_PID represents the name of the UDF.

(iii) GEI_Item Table

| Item | Format | Description |
| --- | --- | --- |
| EQID | A | Primary Key, MAX = 20 NOT NULL |
| GEI_MSGID | A | Primary Key, MAX = 50 NOT NULL |
| GEI_Item | A | MAX = 50 |
| GEI_Format | A | |
| GEI_Data | A | MAX = 255 |
| GEI_Data_B | B | |
| UDF_Enable | Booleam | |
| UDF_DLLID | A | MAX = 50 |
| UDF_PID | A | MAX = 50 |

The GEI_Item table defines the contents of the GEI message data to be transmitted/received. EQID represents the reference number of the corresponding equipment. The GEI_MSGID is the identification code of a GEI message of a specific item. The GEI_Item represents the code of the item. The GEI_Format represents the data type of the item. The GEI_Data means the value of the item. If the format of the item is in binary data, the value of the item is saved in the space GEI_Data_B. The UDF_Enable represents whether to execute the UDF or not. The UDF_DLLID represents the name of the dynamic linkage library including the UDF. The UDF_PID is the name of the UDF.

(3) Comparisons Between the Prior Art and the Present Invention

Comparing the production scenario databases in the prior art and the present invention, it can be found that the scenario database of the prior art is less expandable, and we must define in advance the maximum steps of each process in the scenario table of the prior art. For example, since twelve steps are used in the scenario table of the prior art to represent the longest process, if the new process needs more than twelve steps, we must increase the step number of the table. On the contrary, the production scenario database of the present invention uses a byte to represent the number of process steps (the maximal value of process steps is 255), and defines the semantic rule of a process so that in the present invention, the process steps are edited into the proper table items under the semantic rule, and then the editing of the production scenario can be completed without the necessity of modifying the structure of the database schema.

In addition, the production scenario database of the prior art can only cope with the static production scenarios, while the user-defined functions can be added into the production scenario database of the present invention for handling the dynamic operating scenarios.

3. Equipment Behavior Database

The database used in the equipment driver of the present invention is called the equipment behavior database.

(1) The Prior Art

The equipment behavior database has three tables: command/behavior table, sequence/content table, and SECS parameter table. They are presented below.

Command/Behavior Table

| BID | Transaction | Step | 1 | 2 | 3 | 4 | 5 | 6 | 7 | 8 | 9 | 10 |
|---|---|---|---|---|---|---|---|---|---|---|---|---|
| 1 | 0 | 0 | GR-configuration | S-s1f1 | R-s1f2 | S-s1f15 | S-s1f16 | S-s5f3 | R-s5f4 | GS-commack | EOB | |
| 2 | 0 | 0 | GR-upload recipe | S-s7f5 | R-s7f6 | GS-recipe | EOB | | | | | |
| 3 | 0 | 0 | GR-download recipe | S-s7f1 | R-s7f2 | S-s7f3 | R-s7f4 | GS-commack | EOB | | | |
| 4 | 0 | 0 | GR-terminal display | S-s10f3 | R-s10f4 | GS-commack | EOB | | | | | |
| . | . | . | . | . | . | . | . | . | . | . | . | . |
| . | . | . | . | . | . | . | . | . | . | . | . | . |
| . | . | . | . | . | . | . | . | . | . | . | . | . |

(S: Send, R: Receive, GS: Send GEI, GR: Receive GEI, EOB: End of Behavior)

Sequence/Content Table

| Message | Sequence | Reply A | Primary |
|---|---|---|---|
| slf1 | NULL | L2, <GMDLN>, <GSOFTREV> | NULL |
| slf2 | L2, <MDLN>, <SOFTREV> | NULL | L2, <GMDLN>, <GSOFTREV> |
| slf5 | <SFCD> | <COMMACK> | <SFCD> |
| slf6 | <ABS> | NULL | <ABS> |
| slf13 | L2, <MDLN>, <SOFTREV> | L2, <COMMACK>, L2, <GMDLN>, <GSOFTREV> | L2, <GMDLN>, <GSOFTREV> |
| slf14 | L2, <COMMACK>, L2, <MDLN>, <SOFTREV> | NULL | L2, <COMMACK>, L2, <MDLN>, <SOFTREV> |

-continued

Sequence/Content Table

| Message | Sequence | Reply A | Primary |
|---|---|---|---|
| slf25 | <ABS> | <ABS> | <ABS> |
| slf126 | <ABS> | NULL | <ABS> |
| : | : | : | : |

SECS Parameter Table

| Key | format | Length | value | description |
|---|---|---|---|---|
| ABS | 8 | 7 | 1234567 | any binary string |
| ACK3 | 8 | 1 | 0 | ack code |
| ACKC5 | 8 | 1 | 0 | ack code |
| ACKC6 | 8 | 1 | 0 | ack code |
| ACKC7 | 8 | 1 | 0 | ack code |
| ALCD | 8 | 1 | 0 | alarm code byte |
| ALED | 8 | 1 | 0 | alarm enable/disable code |
| ALID | 42 | 1 | 0 | alarm identification |
| ALTX | 16 | 1 | 0 | alarm text |
| CEID | 25 | 1 | 0 | collection event id |
| CMDA | 8 | 1 | 0 | command ack code |

-continued

SECS Parameter Table

| Key | format | Length | value | description |
|---|---|---|---|---|
| COMMACK | 8 | 1 | | establish communication code, 1 byte |
| DATAID | 25 | 1 | 0 | data id |
| DSID | 26 | 2 | 0 | Data set id |
| . . . | | | | |

(2) The Present Invention

The present invention redesigns the equipment behavior database. The behavior database not only defines the equipment rules, but also supports the information communication between the configuration controller and the equipment driver so that the behavior database still retains a part of the tables used by the production scenario database for corresponding the production scenarios with the equipment rules.

The behavior database include tables of the GEI_Couple, the GEI_Sequence, the GEI_Item, the GEI2SECS, the SECS_Sequence, the SECS_Item, the SECS2GEI, and the SECS_Default, respectively. They have the following formats.

(i) GEI_Couple Table

| Item | Format | Description |
|---|---|---|
| EQID | A | Primary Key, MAX = 20, NOT NULL |
| GEI_Primary | A | Primary Key, MAX = 50, NOT NULL |
| GEI_Reply | A | MAX = 50, NOT NULL |

When the equipment driver receives the GEI message from the configuration controller the equipment driver may reply the corresponding message. Therefore, this GEI_Couple table is defined to explain the relationship of the matching GEI messages in order that the equipment driver can locate and reply the correct message. EQID represents the reference number of the equipment for such message. The GEI_Primary is the code of the GEI message received by the equipment driver. The GEI_Reply is the code of the GEI message to be replied. The other messages that do not need replies will not be shown in this table.

(ii) GEI_Sequence Table

| Item | Format | Description |
|---|---|---|
| EQID | A | Primary Key, MAX = 20, NOT NULL |
| GEI_MSGID | A | Primary Key, MAX = 20, NOT NULL |
| GEI_MSGTYPE | I1 | |
| GEI_DS | A | MAX = 255 |
| UDF_Replace | Boolean | |
| UDF_Enable | Boolean | |
| UDF_DLLID | A | MAX = 50 |
| UDF_PID | A | MAX = 50 |

The definition of each item in the above table is the same as that of the GEI_Sequence table in the production scenario database.

(iii) GEI_Item Table

| Item | Format | Description |
|---|---|---|
| EQID | A | Primary Key, MAX = 20, NOT NULL |
| GEI_MSGID | A | Primary Key, MAX = 50, NOT NULL |
| GEI_Item | A | MAX = 50 |
| GEI_Format | A | |
| GEI_Data | A | MAX = 255 |
| GEI_Data_B | B | |
| UDF_Enable | Boolean | |
| UDF_DLLID | A | MAX = 50 |
| UDF_PID | A | MAX = 50 |

The definition of each item in the above table is the same as that of the GEI_Item table in the production scenario database.

(iv) GEI2SECS Table

| Item | Format | Description |
|---|---|---|
| EQID | A | Primary Key, MAX = 20, NOT NULL |
| GEI_MSGID | A | Primary Key, MAX = 50, NOT NULL |
| SECS_IDs | A | MAX = 255 |

This table describes the SECS II message in correspondence with each GEI message. The SECS_IDs represent a combination of a series of the SECS_ID. Because each SECS_ID may have different versions, a suffix is added behind the SECS_ID for differentiation.

The rule for writing SECS_IDs is:

$$<S_{x1}F_{y1}\_suffix><S_{x2}F_{y2}\_suffix> \ldots <S_{xN}F_{yN}\_suffix>.$$

(v) SECS_Sequence Table

| Item | Format | Description |
|---|---|---|
| EQID | A | Primary Key, MAX = 20, NOT NULL |
| GEI_MSGID | A | Primary Key, MAX = 50, NOT NULL |
| SECS_ID | A | Primary Key, MAX = 50, NOT NULL |
| Stream | I1 | |
| Function | I1 | |
| Waiting | Boolean | |
| SECS_DS | A | MAX = 255 |
| UDF_Replace | Boolean | |
| UDF_Enable | Boolean | |
| UDF_DLLID | A | MAX = 50 |
| UDF_PID | A | MAX = 50 |

The spaces for SECS_IDs in the GEI2SECS table only represent the type and sequence of the SECS messages without clearly showing the data sequence of messages. The above table defines a detailed message data sequence for a SECS_ID listed in the spaces of SECS_IDs in each GEI2SECS table. The EQID represents the reference number of the corresponding equipment for the message. The GEI_MSGID represents the code of GEI message. The SECS_ID represents the code of the SECS II message. The Stream represents a stream ID of the SECS II message. The Function represents a function ID of the SECS II message. The Waiting represents a waiting bit of the SECS II message. The SECS_DS represents the data sequence of SECS II message. The UDF_Replace represents whether the user define function (UDF) is to be used for replacing the process of handling the SECS II message. The UDF_Enable represents whether to execute the UDF or not. The sample format of the SECS_DS is:

<L2><ITEM 1 ID><L2><ITEM 2 ID><ITEM 3 ID>.

(vi) SECS_Item Table

| Item | Format | Description |
|---|---|---|
| EQID | A | Primary Key, MAX = 20, NOT NULL |
| GEI_MSGID | A | Primary Key, MAX = 50, NOT NULL |
| SECS_ID | A | Primary Key, MAX = 50, NOT NULL |
| SECS_Item | A | MAX = 50 |
| SECS_Format | A | |
| GEI_Item | A | MAX = 50 |
| Default | A | MAX = 255 |
| Default_B | B | |
| UDF_Enable | Boolean | |

-continued (vi) SECS_Item Table

| Item | Format | Description |
|---|---|---|
| UDF_DLLID | A | MAX = 50 |
| UDF_PID | A | MAX = 50 |

This table is mainly used for the correspondence of the data in the GEI message with the SECS II message data. EQID represents the reference number of the corresponding equipment for the message. The GEI_MSGID is the code of the GEI message. The SECS_ID is the message code of the SECS II message. The SECS_Item represents the item code of the SECS II message. The SECS_Format represents the format of the item. The GEI_Item is the GEI item that corresponds to the item of the SECS II message. The Default is a preset value of the SECS_Item. If the item is represented in a binary format, the value of the item is saved in the Default_B space.

(vii) SECS2GEI Table

| Item | Format | Description |
|---|---|---|
| EQID | A | Primary Key, MAX = 20, NOT NULL |
| SECS_ID | A | Primary Key, MAX = 50, NOT NULL |
| GEI_MSGID | A | MAX = 50 |
| SECS_Primary | A | MAX = 255 |
| PUDF_Replace | Boolean | |
| PUDF_Enable | Boolean | |
| PUDF_DLLID | A | MAX = 50 |
| PUDF_PID | A | MAX = 50 |
| SECS_Reply_ID | A | |
| SECS_Secondary | A | MAX = 255 |
| SUDF_Replace | Boolean | |
| SUDF_Enable | Boolean | |
| SUDF_DLLID | A | MAX = 50 |
| UDF_PID | A | MAX = 50 |

This table is specifically provided for collecting the messages actively sent by the equipment. When the equipment driver receives the message actively sent from the equipment, the equipment driver must at first sends the corresponding reply message to the equipment in order to avoid the transaction time out. EQID represents the reference number of the corresponding equipment for the message. The SECS_ID is the code of the SECS II message actively sent by the equipment. The GEI_MSGID represents the code of GEI message to be sent back to the configuration controller. The SECS_Primary is the data sequence for the SECS II message received from the equipment. The PUDF_Replace represents whether the user-defined function (UDF) is to be used to replace the original message-processing function. The PUDF_Enable represents whether to execute the user-defined function (UDF) or not. The PUDF_DLLID represents the name of the dynamic linkage library for transmitting the primary SECS II message. The PUDF_PID represents the user-defined function name for transmitting the primary SECS II message. The SECS_Reply_ID represents the SECS II message code for replying to the equipment. The SECS_Secondary is the data sequence of the replying SECS II message. The SUDF_Replace represents whether the user-defined function (UDF) is to be used to replace the message processing function for replying to the equipment. The SUDF_Enable represents whether to execute the UDF or not while processing the replying message. The SUDF_DLLID represents the dynamic linkage library file name used for processing the message for replying to the equipment. The SUDF_PID represents the name of the user define function used for processing the message for replying to the equipment.

(viii) SECS_Default Table

| Item | Format | Description |
|---|---|---|
| EQID | A | Primary Key, MAX = 20, NOT NULL |
| SECS_ID | A | Primary Key, MAX = 50, NOT NULL |
| SECS_Item | A | MAX = 255 |
| GEI_Item | A | MAX = 255 |
| SECS_Format | A | |
| SECS_Value | A | MAX = 255 |
| SECS_Value_B | B | |
| UDF_Enable | Boolean | |
| UDF_DLLID | A | MAX = 50 |
| UDF_PID | A | MAX = 50 |

This table is designed to correspond to Tables (iii) to (vii) mentioned above. When the equipment driver receives the primary message sent by the equipment, the secondary message to be sent back can be edited in this SECS_Default table first for facilitating the program to get data therefrom. EQID represents the reference number of the corresponding equipment for the message. The SECS_ID is the code of the SECS II message. The SECS_Item represents the item of the SECS II message. The GEI_Item represents the code of the GEI_MSG corresponding to the SECS_Item. The SECS-_Format is the item format of the SECS II message. The SECS_Value is the item value of the SECS II message. If the item has a binary format, the value of item is saved in the SECS_Value_B space.

(3) Comparisons Between the Prior Art and the Present Invention

Comparing the equipment behavior databases in the prior art and the present invention, the behavior database of the prior art is less expandable. For example, observing the command/behavior table in page 14, the maximal step number of a process is ten. If the behavior process steps are more than ten, this behavior table needs to be redefined. While in the present invention, the behavior database uses a byte to represent the number of process steps (the maximal value of process steps is 255), and the semantic rule of a process is defined. Therefore, in the present invention, the equipment behavior process can be edited into the proper space according to the semantic rule without the necessity of modifying the structure of the database schema.

In the behavior database of the prior art, it neither clearly distinguishes the SECS II message sent to or received from the equipment, nor clearly defines the relationship between the equipment behavior database and the production scenario database. In the present invention, all these shortcomings in the prior art are improved or solved. In addition, the present behavior database further provides the capability of using the user-defined functions, which the prior art does not have, in order to deal with the dynamic equipment rules.

4. Message Transmission Process

The present invention separates the production scenarios in the semiconductor factory from the equipment rules so as to divide the Equipment Manager into the configuration controller and the equipment driver. Also, the present invention establishes the production scenarios and the equipment rules by way of editing data into the scenario database and behavior database, and through the communication of the GEI message. The main six processes of this equipment management scheme or method are described in the following.

(1) Packaging the GEI Message in the Configuration Controller

Figure 6:
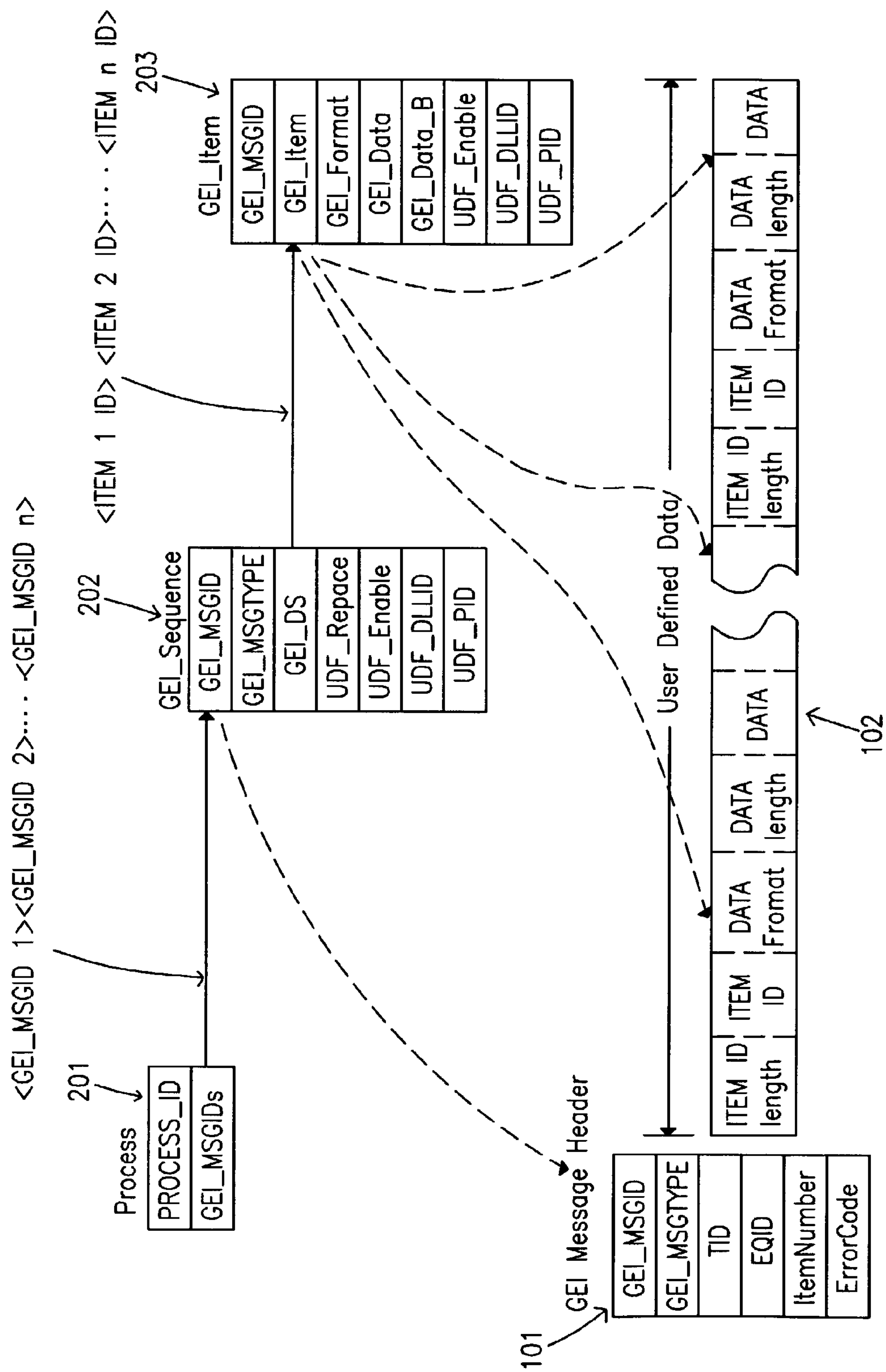
FIG. 6 is a schematic diagram showing the packing procedure of the GEI message in the configuration controller according to a preferred embodiment of the present invention.

FIG. 6 shows the process of reading the production scenario defined in the local database of the configuration controller and then being packaged according to the GEI message specification. Via this process the production scenario data can be transmitted to the equipment driver through the GEI message. The processes include that the control scheme locates the codes of the designated GEI message according to the contents of the GEI_MSGIDs space in the process database 201, uses the codes to find the related information through searching the GEI_Squence database 202, and then copies the contents of each GEI-_MSGID and GEI_MSGTYPE into the specific GEI Message Header 101. If there is a user-defined function (UDF) specified in the UDF_Replace or UDF_Enable space of the GEI_Sequence database 202, the UDF will be executed first, and then the GEI message will be packaged. If no UDF is specified, then GEI_DS in GEI_Sequence 202 is checked. The GEI_DS space of the GEI_Sequence database 202 includes several item codes for the GEI message. The number and the names of the item codes can be extracted by semantic analyses. Wherein the number of the item codes will be edited into the ItemNumber space of the GEI Message header 101. The names of the item codes can be used for searching the GEI_Item database 203 in order to locate the corresponding data to be edited into the spaces of the message contents of User Defined Data 102.

Figure 7:
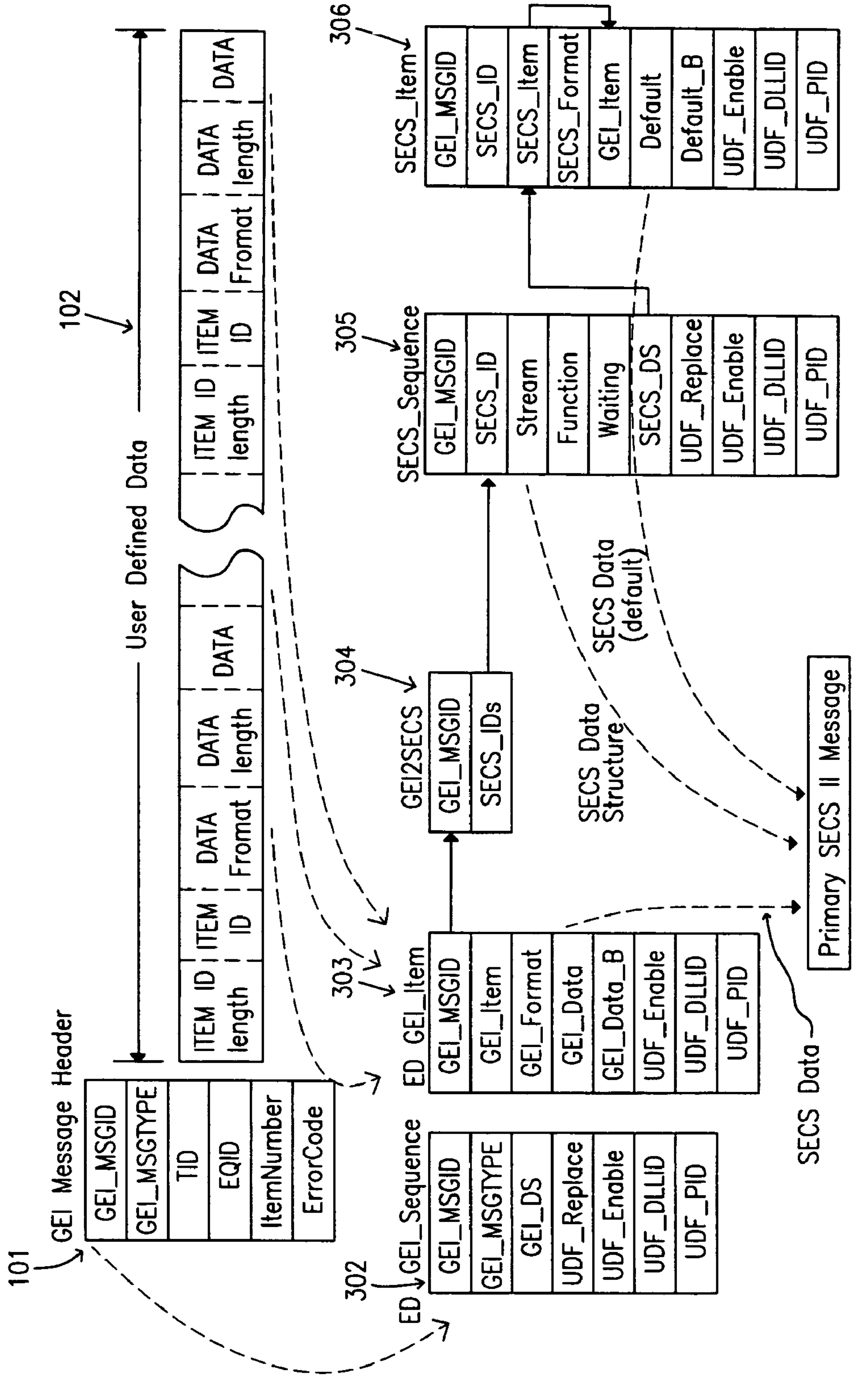
FIG. 7 is a schematic diagram showing the transformation from the production scenarios to the equipment rules in the equipment driver according to a preferred embodiment of the present invention.

(2) Transforming the Production Scenarios into the Equipment Rule in the Equipment Driver FIG. 7 shows the process of reading the contents of the production scenarios included in the GEI message, and transforming the production scenarios into the equipment rules complying with the SECS II message and according to the transforming rules defined in the behavior database of the equipment driver. The process includes that the control scheme first saves the received GEI message respectively in the ED GEI_Sequence database 302 and ED GEL_Item database 303 of the equipment behavior database, then finds the SECS II message code(s) (from zero to several) corresponding to the GEI message through searching the GEI2SECS database 304, and locates the corresponding SECS II message structure(s) according to those SECS II message code(s) through sequentially searching the SEC-S_Sequence database 305 and SECS_Item database 306. Since the SECS_Item database 306 records the item codes of the corresponding GEI message, the data transmitted through the GEI message can be edited into the SECS II message structure by searching ED GEI_Item database 303. Finally, the primary SECS II message is packed by collecting SECS data structure (Stream and Function) from SEC-S_Sequence 305, and specific SECS data from ED GEL_Item database 303 or default SECS data from SEC-S_Item database 306.

Figure 8:
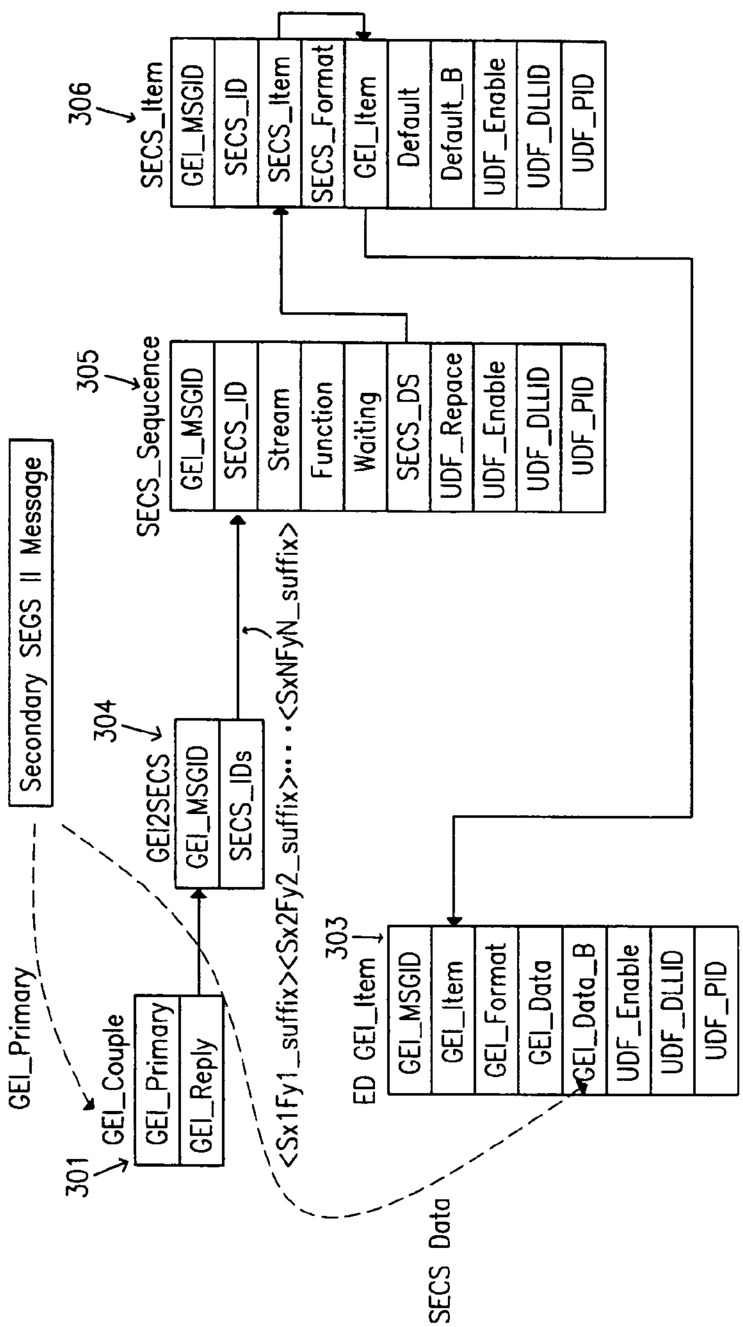
FIG. 8 is a schematic diagram showing the process in the equipment driver after receiving the secondary SECS II message from the equipment according to a preferred embodiment of the present invention.

(3) Receiving the Secondary SECS II Message from the Equipment in the Equipment Driver FIG. 8 shows the process of reading the contents of the secondary SECS II message from the equipment, and saving the message contents into the database table designated by the transforming rule. Then, according to the transforming rule defined in the local database, the equipment driver can send the relevant data back to the configuration controller via processes (5) and (6), which will be presented later. The processes include that the control scheme locates the paired code for the corresponding GEI message according to the GEL_Couple database 301 after receiving the secondary SECS II message from the equipment; finds the SECS II message codes (from zero to several) corresponding to the GEI message through searching the GEI2SECS database 304 according to the paired code; identifies the corresponding SECS message structure according to these SECS II message codes by sequentially searching the SECS_Sequence database 305 and SECS_Item database 306; and edits the data event of the SECS II message into the Default space of the SECS_Item database 306 (or the Default_B space if the data event of the SECS II message is in a binary format). If the GEL_Item space of the SECS_Item database 306 has a designated code for the GEI message, the control scheme will search ED GEI_Item database 303, and copy contents of the SECS II message into the corresponding space of the ED GEI_Item database 303. Later, these contents will be sent to the configuration controller via the GEI message.

Figure 9:
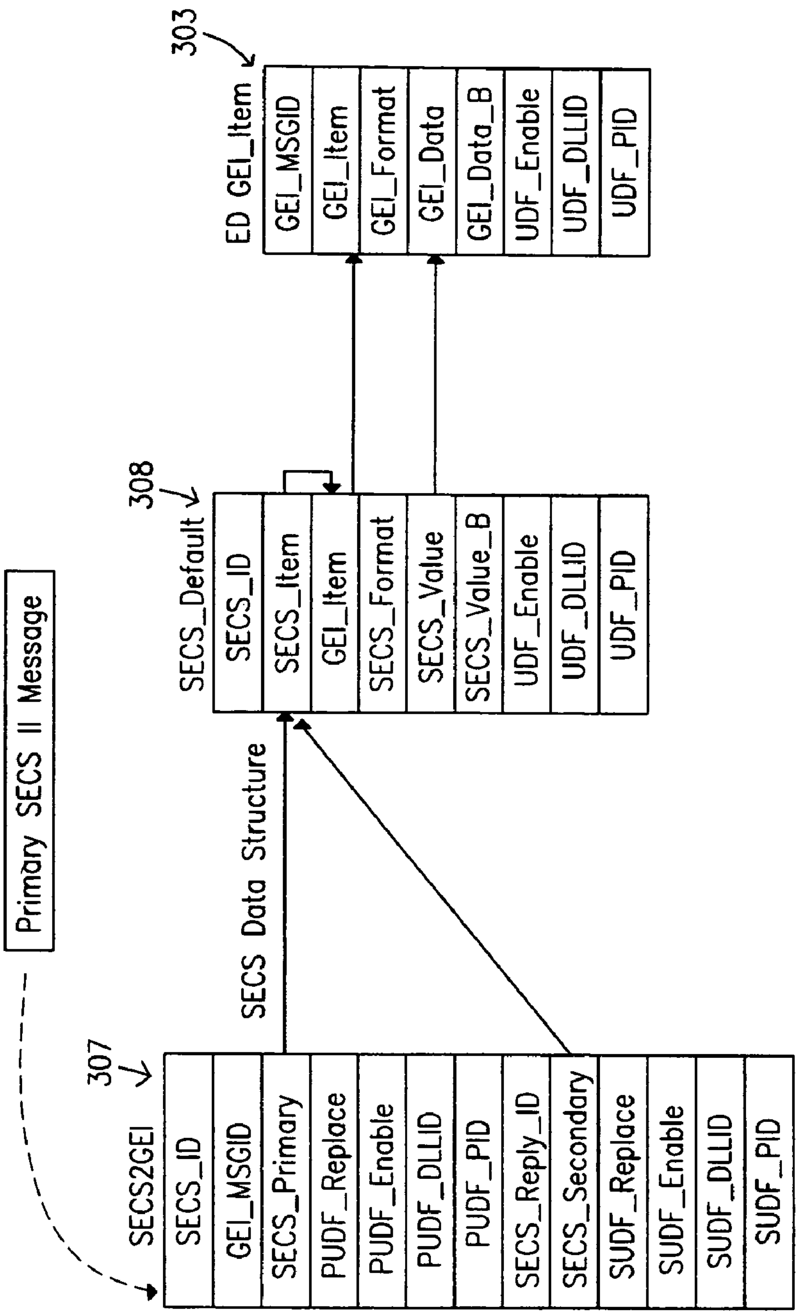
FIG. 9 is a schematic diagram showing the process in the equipment driver after receiving the primary SECS II message from the equipment according to a preferred embodiment of the present invention.

(4) The Equipment Driver Receives the Primary SECS II Message from the Equipment FIG. 9 shows the process of reading the contents of the primary SECS II message from the equipment, and saving the message contents into the database table designated by the transformation rule. Then, according to the transformation rule defined in the local database, the equipment driver can send the relevant data to the configuration controller via processes (5) and (6), which will be presented later. The process includes that the control scheme first semantically analyzes the structure of the primary SECS II message referred to the SECS_Primary space of the SECS2GEI database 307 after receiving the primary SECS II message from the equipment, then extracts the item codes of the SECS II message, and saves the data into the SECS_Value space of the SECS_Default database 308 (or into the SECS-_Value_B space if the data for the SECS II message is in a binary format) through searching the SECS_Default database 308 according to the item codes of these SECS II messages. If the GEI_Item space of the SECS_Default database 308 has a designated code for the GEI message, the control scheme will search the ED GEI_Item database 303, and copy contents of the SECS II message into the corresponding space of the ED GEI_Item database 303. Later, these contents will be sent to the configuration controller via the GEI message.

If the W-bit of the primary SECS II message is one, the equipment driver needs to send a secondary SECS II message back to the equipment. Under this situation, the control scheme will semantically analyze the SECS II message structure designated by the SECS_Secondary space in the SECS2GEI database 307, find out the item codes of the secondary SECS II message, and extract contents of the secondary SECS II message through searching the SECS-_Default database 308. Finally, the secondary SECS II message is formed and ready to be sent to the equipment.

(5) The Packing Procedure of the GEI Message in the Equipment Driver

Figure 10:
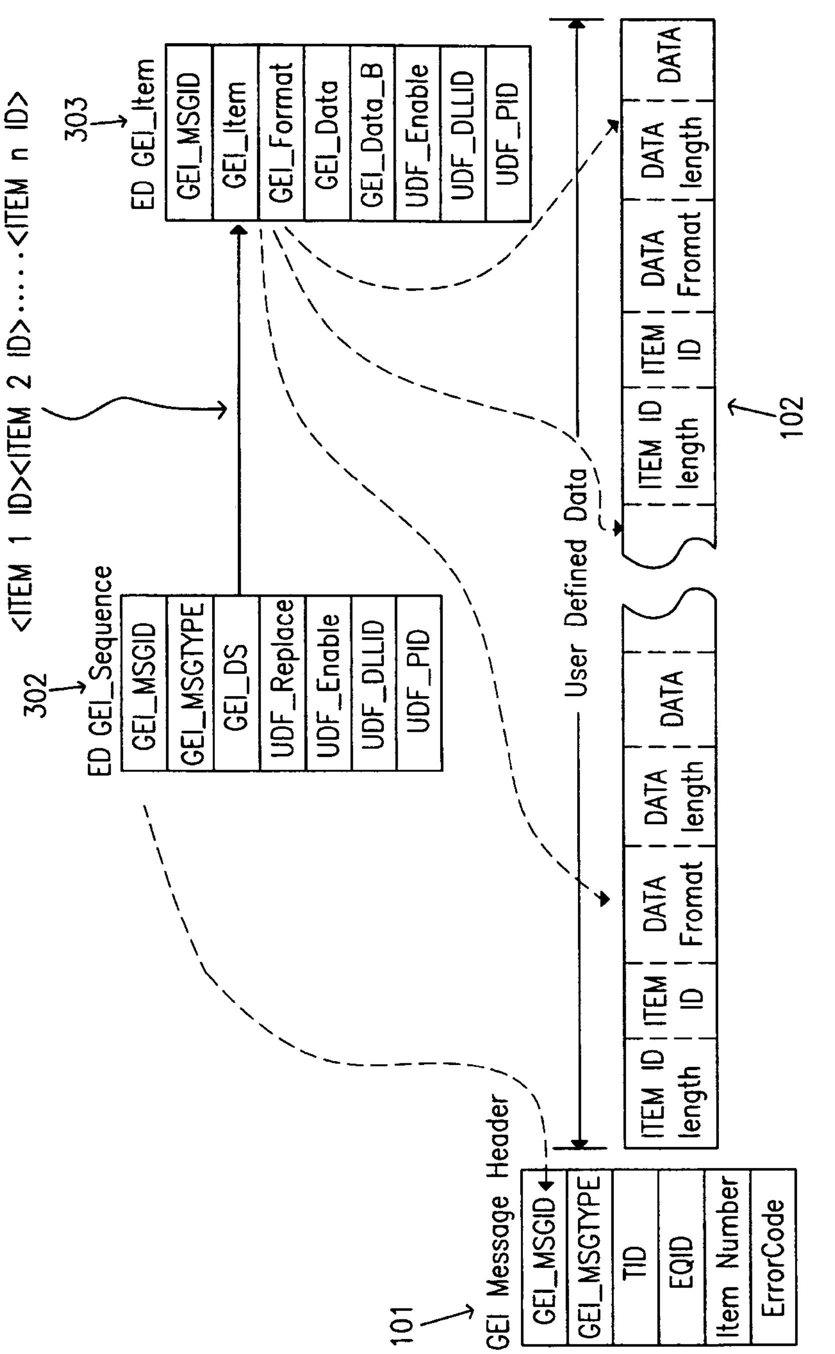
FIG. 10 is a schematic diagram showing the packing procedure of the GEI message in the equipment driver according to a preferred embodiment of the present invention.

FIG. 10 shows the packing procedure of the GEL message in the equipment driver after the processes (3) and (4)

mentioned above are finished. The detailed process is described as follows. After completing the processes (3) and (4), the control scheme will search the ED GEI_Sequence database 302 and pick out the item codes for each GEI message stored in the GEI_DS space of the ED GEI_Sequence database 302 if the GEI message is to be transmitted to the configuration controller. The ED GEI_Item database 303 is then searched to pick out the data according to the item codes for each GEI message. Finally, the picked data can be edited into the GEI message header 101 and each space of User Defined Data 102 for the GEI message to be transmitted to the configuration controller.

Figure 11:
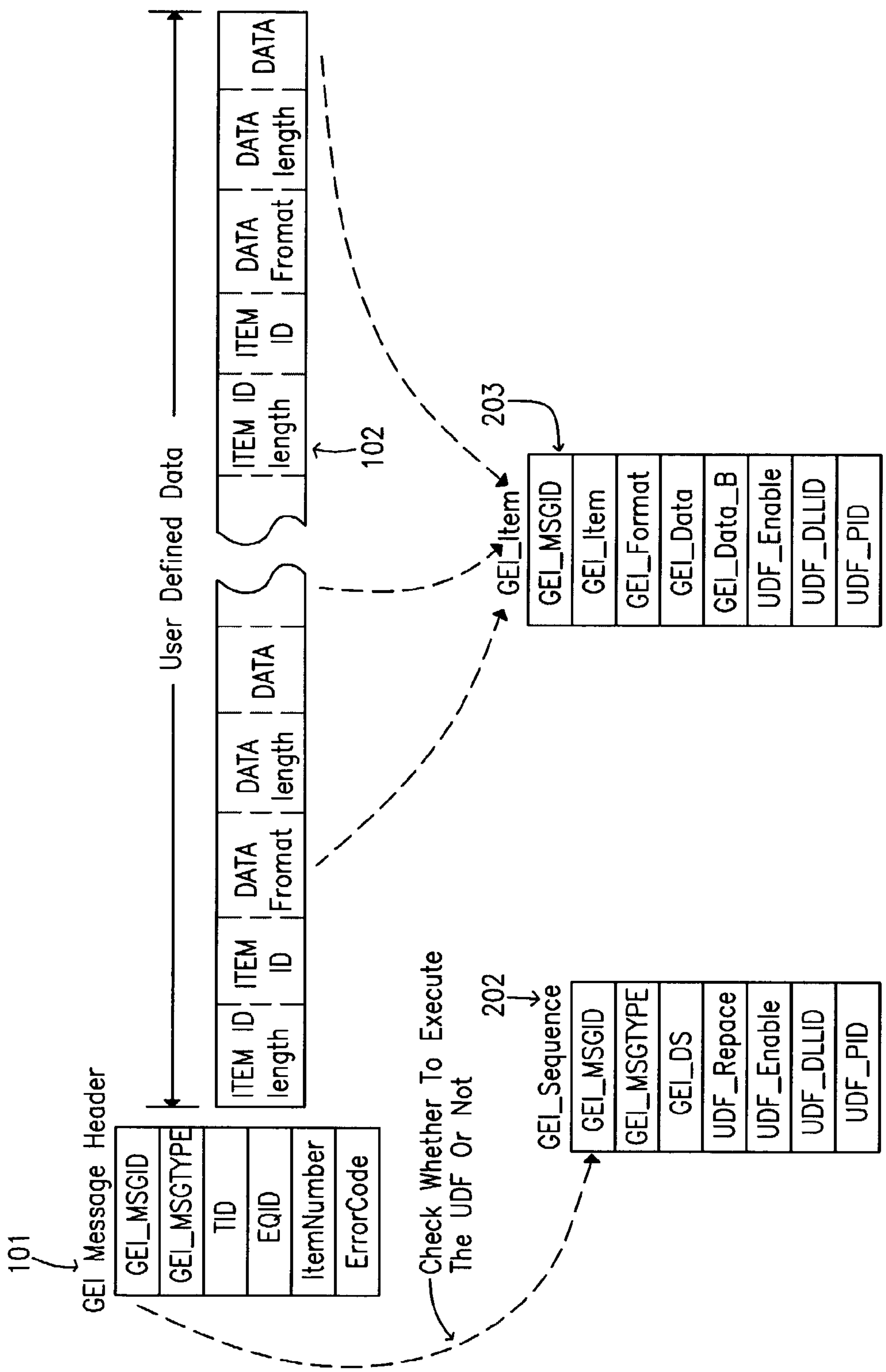
FIG. 11 is a schematic diagram showing the process in the configuration controller after receiving the GEI message according to a preferred embodiment of the present invention.

(6) Receiving the Generic Equipment Interface Message in the Configuration Controller FIG. 11 shows the process of reading the data contents transmitted by the equipment driver via the GEI message, and then saving those data into locations designated by the local database of the configuration controller. The process is described as follows. After the configuration controller receives the GEI message sent from the equipment driver, data of the GEI message items can be sequentially written into the GEI_Data space of the GEI_Item database 203 (or the GEI_Data_B space if the data are binary) according to the GEI Message Header 101 and the User Defined Data 102 of the GEI message, and according to the definitions in the GEI_Sequence database 202 and the GEI_Item database 203 of the configuration controller.

Figure 12:
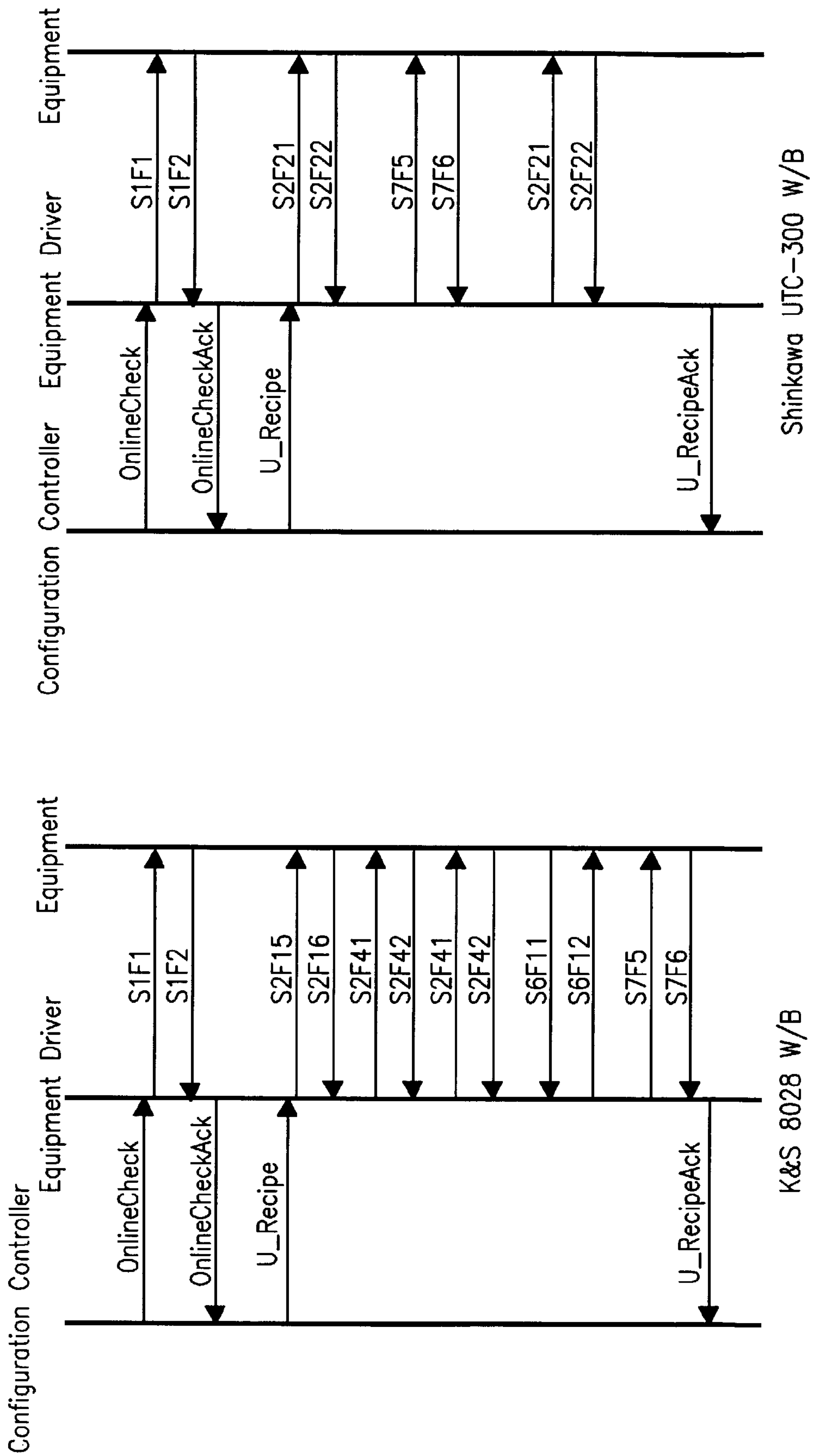
FIG. 12 is a schematic diagram showing the operating scenarios of the Generic Equipment Manager according to a preferred embodiment of the present invention.

The present invention will now be illustrated by way of a preferred embodiment utilizing two different wire bonders, K&S 8028 and Shinkawa UTC-300, with the same production scenario. The production scenario is defined as follows: Checking by an Equipment Manager whether the wire bonders are on-line or not; if they are on-line, executing the commands of uploading recipe and retrieving several data from the wire bonders. Although the same production scenario is involved in the K&S 8028 and Shinkawa UTC-300, their equipment rules are different due to their different equipment characteristics, as shown in FIG. 12.

The present invention separates the production scenarios in the semiconductor factory from the equipment rules, and changes the production scenarios and the equipment rules by means of editing the contents of associated databases. Since the same production scenario is involved in this embodiment, there's no need to change the production scenario database. However, we need to change the equipment behavior database. The database-editing scheme for the above embodiment according to the present invention is described as follows.

(1) The Production Scenario Database

The production scenario database includes three tables. They are tables of Process, GEI_Sequence, and GEI_Item. Since all tables use the same reference number of the equipment in the embodiment, the EQID space will not be shown in each table.

(i) Process Table

| PROCESS_ID | GEI_MSGIDs |
|---|---|
| DemoProcess | <OnlineCheck><U_Recipe> |

This table is used for editing in the production scenario set by the configuration controller. In this example, the DemoProcess process will be executed. This process has two events, i.e. OnlineCheck and U_Recipe.

(ii) GEI_Sequence Table

| GEI_ MSGID | GEI_ MSGTYPE | GEI_ DS | UDF_ Replace | UDF_ Enable | UDF_ DLLID | UDF_ PID |
|---|---|---|---|---|---|---|
| Online-Check | 0 | | False | False | | |
| U_ Recipe | 0 | <PP_ PATH> <PPID> | False | False | | |

In the GEI_Sequence table, the OnlineCheck message is only a message without any content. The U_Recipe message transmits the process program path (PP_PATH) and the process program ID (PPID) to the equipment driver.

(iii) GEI_Item Table

| GEI_ MSGID | GEI_ Item | GEI_ Format | GEI_ Data | GEI_ Data_B | UDF_ Enable | UDF_ DLLID | UDF_ PID |
|---|---|---|---|---|---|---|---|
| OnlineCheckAck | AckCode | Boolean | | | True | CA_ DemoDLL | OnlineCheckResult |
| U_Recipe | PP_PATH | A | C:\recipe\ | | False | | |
| U_Recipe | PPID | A | BSCAT001. BND | | False | | |
| U_RecipeAck | AckCode | Boolean | | | True | CA_ DemoDLL | SaveRecipe |

Because the OnlineCheck message only has a message without any content, this message is not shown in this GEI_Item table. But the OnlineCheckAck message corresponding to the acknowledgement of OnlineCheck message still needs to be processed so that the OnlineCheckAck message is placed in this table. The pairing relationship between OnlineCheck and OnlineCheckAck can be consulted in the contents of GEI_Couple table of the equipment behavior database.

The on-line status can be represented by defining the Boolean value sent back by OnlineCheckAck. The OnlineCheckResult is the user defined function to take charge of the subsequent actions, e.g., renewing the on-line status. The PP_PATH and PPID of the U_Recipe only provide the path and the file name of the "Recipe" (or process program). The U_RecipeAck includes a sent back Boolean value for representing whether the "Upload Recipe" is successful or not.

Then the configuration controller calls the user defined function "SaveRecipe" to handle the subsequent actions.

(2) The Equipment Behavior Database

The equipment behavior database includes eight tables, they are GEI_Couple, GEI_Sequence, GEI_Item, GEI2SECS, SECS_Sequence, SECS_Item, SECS2GEI, and SECS_Default.

(i) GEI_Couple Table

| GEI_Primary | GEI_Reply |
|---|---|
| OnlineCheck | OnlineCheckAck |
| U_Recipe | U_RecipeAck |

The purpose of this table is to record the pairing relationship of the GEI message.

(ii) GEI_Sequence Table

| GEI_MSGID | GEI_MSGTYPE | GEI_DS | UDF_Replace | UDF_Enable | UDF_DLLID | UDF_PID |
|---|---|---|---|---|---|---|
| OnlineCheckAck | 1 | <AckCode> | False | False | | |
| U_ RecipeAck | 1 | <AckCode> | False | False | | |

This GEI_Sequence table used by the equipment driver is similar to that of the configuration controller. It's mainly for packaging the GEI message.

(iii) GEI_Item Table

| GEI_ MSGID | GEI_ Item | GEI_ Format | GEI Data | UDF_ Enable | UDF_ DLLID | UDF_ PID |
|---|---|---|---|---|---|---|
| Online-CheckAck | AckCode | Boolean | | False | | |
| U_Recipe | PP_PATH | A | | False | | |
| U_Recipe | PPID | A | | False | | |
| U_Recipe-Ack | AckCode | Boolean | | False | | |

When the equipment driver receives a GEI message from the configuration controller, the contents of each item of the GEI message will be edited in this GEI_Item table first. And when the equipment driver receives a message from the equipment, the message will also be edited in this table.

(iv) GEI2SECS Table

| GEI_MSGID | SECS_IDs |
|---|---|
| a. The GEI2SECS Table for K&S 8028 W/B | |
| OnlineCheck | <S1F1> |
| OnlineCheckAck | <S1F2> |
| U_Recipe | <S2F15_USD><S2F41_HIT><S2F41_PREP><S7F5> |
| U_RecipeAck | <S2F16_USD><S2F42_HIT><S2F42_PREP><S7F6> |

-continued (iv) GEI2SECS Table

| GEI_MSGID | SECS_IDs |
|---|---|
| b. GEI2SECS Table for Shinkawa UTC-300 W/B | |
| OnlineCheck | <S1F1> |
| OnlineCheckAck | <S1F2> |
| U_Recipe | <S2F21_UP><S7F5><S2F21_OUT> |
| U_RecipeAck | <S2F22_UP><S7F6><S2F22_OUT> |

This table is to edit in the transformation relationship from a GEI message to SECS II Messages.

(v) SECS_Sequence Table

| GEI_MSGID | SECS_ID | Stream | Function | Waiting | SECS_DS | UDF_Replace | UDF_Enable | UDF_DLLID | UDF_PID |
|---|---|---|---|---|---|---|---|---|---|
| a. SECS_Sequence Table for K&S 8028 W/B | | | | | | | | | |
| Online Check | S1F1 | 1 | 1 | T | | False | False | | |
| Online CheckAck | S1F2 | 1 | 2 | F | <L2> <MDLN> <SOFTREV> | False | True | ED_DemoDLL | CheckResult |
| U_Recipe | S2F15_USD | 2 | 15 | T | <L1><L2> <ECID> <ECV> | False | False | | |
| U_Recipe | S2F41_HIT | 2 | 41 | T | <L2> <RCMD> <L0> | False | False | | |
| U_Recipe | S2F41_PREP | 2 | 41 | T | <L2> <RCMD> <L1><L2> <CPNAME> <CPVAL> | False | False | | |
| U_Recipe | S7F5 | 7 | 5 | T | <PPID> | False | True | ED_DemoDLL | WaitForPrep |
| U_RecipeAck | S2F16_USD | 2 | 16 | F | <EAC> | False | False | | |
| U_RecipeAck | S2F42_HIT | 2 | 42 | F | <L2> <HCACK> <L0> | False | False | | |
| U_RecipeAck | S2F42_PREP | 2 | 42 | F | <L2> <HCACK> <L0> | False | False | | |
| U_RecipeAck | S7F6 | 7 | 6 | F | <L2> <PPID> <PPBODY> | False | False | | |
| b. SECS_Sequence Table for Shinkawa UTC-300 W/B | | | | | | | | | |
| OnlineCheck | S1F1 | 1 | 1 | T | | False | False | | |
| OnlineCheckAck | S1F2 | 1 | 2 | F | <L2> <MDLN> <SOFTREV> | False | True | ED_DemoDLL | CheckResult |
| U_Recipe | S2F21_UP | 2 | 21 | T | <RCMD> | False | False | | |
| U_Recipe | S7F5 | 7 | 5 | T | <PPID> | False | False | | |
| U_Recipe | S2F21_OUT | 2 | 21 | T | <RCMD> | False | False | | |
| U_RecipeAck | S2F22_UP | 2 | 22 | F | <CMDA> | False | False | | |
| U_RecipeAck | S7F6 | 7 | 6 | F | <L2><PPID> <PPBODY> | False | False | | |
| U_RecipeAck | S2F22_OUT | 2 | 22 | F | <CMDA> | False | False | | |

Please refer to the preceding two tables, they are to edit therein the data sequence of each SECS II message. Wherein, the OnlineCheck only corresponds to the header of S1F1 so that the corresponding SECS_DS space has no data. The OnlineCheckAck takes the responsibility of handling the reply S1F2 message. If the contents (i.e., the Boolean value for detecting whether the connection is successful) of the GEI message sent back by the OnlineCheckAck cannot match with the contents of the S1F2 message, the user defined function "CheckResult" designated by the OnlineCheckAck will be called after the equipment driver has received the S1F2 message. Then, the result can be edited into the GEI_Item table.

The K&S 8028 wire bonder needs four steps to complete the recipe upload process. After sending out the S2F41_PREP message, the equipment driver needs to wait until the equipment actively sends out the primary S6F11 message, then the equipment driver can continue the uploading process. Therefore, before sending out the S7F5 message, the user defined function "WaitForPrep" will be called to execute the waiting action, and the equipment driver will send the S7F5 message upon receiving the S6F11 message from the equipment so as to complete the action of uploading recipe.

As for the uploading recipe process of the Shinkawa UTC-300 wire bonder, it is much simpler. It just needs to be executed according to the process without any special user defined function.

(vi) SECS_Item Table

| GEI_MSGID | SECS_ID | SECS_Item | SECS_Format | GEI_Item | Default | Default_B | UDF_Enable | UDF_DLLID | UDF_PID |
|---|---|---|---|---|---|---|---|---|---|
| a. SECS_Item Table for K&S 8028 W/B | | | | | | | | | |
| OnlineCheckAck | S1F2 | MDLN | A | | | | False | | |
| OnlineCheckAck | S1F2 | SOFTREV | A | | | | False | | |
| U_Recipe | S2F15_USD | ECID | U2 | | 1102 | | False | | |
| U_Recipe | S2F15_USD | ECV | 14 | | 1 | | False | | |
| U_RecipeAck | S2F16_USD | EAC | B | | | | False | | |
| U_Recipe | S2F41_HIT | RCMD | A | | ENTER_HIT | | False | | |
| U_RecipeAck | S2F42_HIT | HCACK | B | | | | False | | |
| U_Recipe | S2F41_PREP | RCMD | A | | PP_PREP | | False | | |
| U_Recipe | S2F41_PREP | CPNAME | A | | PPID | | False | | |
| U_Recipe | S2F41_PREP | CPVAL | A | PPID | | | False | | |
| U_RecipeAck | S2F42_PREP | HCACK | B | | | | False | | |
| U_Recipe | S7F5 | PPID | A | PPID | | | False | | |
| U_RecipeAck | S7F6 | PPID | A | | | | False | | |
| U_RecipeAck | S7F6 | PPBODY | B | | | | True | ED_DemoDLL | SaveRecipe |
| b. SECS_Item Table for Shinkawa UTC-300 W/B | | | | | | | | | |
| OnlineCheckAck | S1F2 | MDLN | A | | | | False | | |
| OnlineCheckAck | S1F2 | SOFTREV | A | | | | False | | |
| U_Recipe | S2F21_UP | RCMD | I1 | | 16 | | False | | |
| U_Recipe | S2F22_UP | CMDA | I1 | | | | False | | |
| U_Recipe | S2F21_OUT | RCMD | I1 | | −3 | | False | | |
| U_Recipe | S2F22_OUT | CMDA | I1 | | | | False | | |
| U_Recipe | S7F5 | PPID | A | PPID | | | False | | |
| U_RecipeAck | S7F6 | PPID | A | | | | False | | |
| U_RecipeAck | S7F6 | PPBODY | B | | | | True | ED_DemoDLL | SaveRecipe |

The main purpose of the SECS_Item tables are to correspond the SECS_Item with the GEI_Item, and to provide default values for editing the SECS data.

(vii) SECS2GEI Table a. SECS2GEI Table for K&S 8028 W/B

| SECS_ID | GEI_MSGID | SECS_Primary | PUDF_Replace | PUDF_Enable | PUDF_DLLID | PUDF_PID | SECS_Reply_ID | SECS_Secondary | SUDF_Replace | SUDF_Enable | SUDF_DLLID | SUDF_PID |
|---|---|---|---|---|---|---|---|---|---|---|---|---|
| S6F11 | Event Report | | True | False | ED_DemoDLL | Process Event | S6F12 | <ACKC6> | False | False | | |

b. SECS2GEI Table for Shinkawa UTC-300 W/B is not necessary in this example.

Since the process of uploading recipe for the K&S 8028 wire bonder needs to wait for the S6F11 message from the equipment, the user defined function "ProcessEvent" is prepared to take care of the S6F11 message so that the waiting event of the uploading recipe can be handled.

(viii) SECS_Default Table a. SECS_Default Table for K&S 8028 W/B

| SECS_ ID | SECS_ Item | GEI_ Item | SECS_ Format | SECS_ Value | SECS_ Value_B | UDF_ Enable | UDF_ DLLID | UDF_ PID |
|---|---|---|---|---|---|---|---|---|
| S6F12 | ACKC6 | | B | | | False | | |

b. The SECS_Default Table for Shinkawa UTC-300 W/B is not necessary in this example.

According to the above descriptions of the illustrated example, it becomes clear that the present invention can change production scenarios and equipment rules of the Equipment Manager by editing the contents of associated databases without the necessity of changing the primary program architecture and/or coding of the Equipment Manager. As such, the present invention can manager various types of equipment and handle different production scenarios so as to achieve generality and reusability to the maximal extent. Accordingly, the difficulty and inconvenience of modifications and adjustments for coping with different types of equipment and various production scenarios can be solved. Therefore, the present invention provides a significant improvement for the development of the semiconductor equipment automation.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An equipment management method for managing at least one piece of equipment through an equipment manager, said equipment manager including a configuration controller, an equipment driver and a generic equipment interface (GEI) having a GEI message specification used as a communication standard between said configuration controller and said equipment driver, said equipment management method comprising:

defining a plurality of production scenario rules in a production scenario database of said configuration controller, and a plurality of equipment behavior rules in an equipment behavior database of said equipment driver;

receiving a command from a manufacturing execution system (MES);

converting said command into at least one first production scenario by looking up a corresponding production scenario rule in said production scenario database;

converting said first production scenario into at least one first GEI message with said GEI message specification;

transmitting said first GEI message to said equipment driver;

converting said first GEI message into at least one first equipment communication message regulated by an equipment communication protocol by looking up the corresponding equipment behavior rule in said equipment behavior database;

transmitting said at least one first equipment communication message to said equipment;

receiving at least one second equipment communication message from said equipment, wherein said second equipment communication message is regulated by said equipment communication protocol;

converting said second equipment communication message into at least one second GEI message by looking up said corresponding equipment behavior rule in said equipment behavior database;

transmitting said second GEI message to said configuration controller;

converting said second GEI message into at least one second production scenario with said GEI message specification; and transmitting said second production scenario to said MES.

2. The equipment management method of claim 1, wherein said step of converting said command into said first production scenario; said step of converting said first production scenario into said first GEI message; and said step of transmitting said first GEI message to said equipment driver are performed by said configuration controller.

3. The equipment management method of claim 1, wherein said configuration controller receives at least one event data from said equipment driver via said second GEI message; edits and saves said event data into said production scenario database; and transmits said event data to said MES if needed.

4. the equipment management method of claim 1, wherein said equipment driver receives controlling data from said configuration controller via said first GEI message, and saves said controlling data into a specific space allocated in said equipment behavior database, and converts said controlling data into at least one first controlling message in accordance with said equipment communication protocol, and transmits said first controlling message to said equipment.

5. The equipment management method of claim 1, wherein said step of receiving said second equipment communication message from said equipment; said step of converting said second equipment communication message to said second GEI message; and said step of transmitting said second GEI message to said configuration controller are done by said equipment driver.

6. The equipment management method of claim 1, wherein said equipment behavior rules comply with said equipment communication protocol.

7. The equipment management method of claim 1, wherein said equipment communication protocol includes SECS II (SEMI Equipment Communications Standard II).

8. The equipment management method of claim 1, wherein said production scenario rules and said equipment behavior rules are deployed or modified by editing the contents of said production scenario database and said equipment behavior database without modifying codes of said equipment manager.

9. The equipment management method of claim 1, wherein said equipment manager is able to handle normally all kinds of said first production scenario; said second production scenario; said first equipment communication message; and said second equipment communication message by merely editing contents of said production scenario database and said equipment behavior database.

10. The equipment management method of claim 1, wherein said equipment manager is able to handle an exception to said first production scenario; that to said second production scenario; that to said first equipment communication message; and that to said second equipment communication message by establishing at least one user defined function (UDF).

* * * * *